United States Patent [19]

Brooks et al.

[11] 4,356,003

[45] Oct. 26, 1982

[54] COPOLYMERS

[75] Inventors: Herbert Brooks, Twyford; Frederick A. Waite, Farnham Common, both of England

[73] Assignee: Imperial Chemical Industries Limited, London, England

[21] Appl. No.: 124,251

[22] Filed: Feb. 25, 1980

[30] Foreign Application Priority Data

Mar. 19, 1979 [GB] United Kingdom ................ 7909483

[51] Int. Cl.$^3$ .............................................. C10L 1/22
[52] U.S. Cl. ............................................ 44/62; 44/70; 44/71; 526/317; 526/208
[58] Field of Search ............... 44/62, 70, 71; 526/317, 526/208

[56] References Cited

U.S. PATENT DOCUMENTS 3,803,034  4/1974  Gaydasch ............................. 44/62
3,812,034  5/1974  Gaydasch ............................. 44/62

*Primary Examiner*—Winston A. Douglas
*Assistant Examiner*—Y. Harris-Smith
*Attorney, Agent, or Firm*—Cushman, Darby & Cushman

[57] ABSTRACT

Copolymers are described of at least 75% by weight of tert-butyl styrene, from 1% to 24% by weight of a copolymerizable second monomer and from 1% to 10% by weight of methacrylic acid, the copolymers having certain specified solubility and rheological characteristics in AVTUR 50 aviation kerosene. A process for making the copolymers by aqueous emulsion polymerization of the monomers under certain defined conditions is also described. The copolymers are useful as additives to liquid hydrocarbon aircraft fuels for the purpose of reducing the tendency of such fuels to form inflammable mists under shock conditions.

11 Claims, No Drawings

COPOLYMERS

This invention relates to novel copolymers derived predominantly from tert-butylstyrene, to a process for making the copolymers and to the use of the copolymers as additives to liquid hydrocarbon fuels, typically aviation kerosene, for the purpose of reducing the tendency of such fuels to form inflammable mists when subjected to shock.

According to a first aspect of the invention, there is provided a copolymer of (i) at least 75% by weight of tert-butyl-styrene, (ii) from 1% to 24% by weight of a second monomer selected from the acrylic and methacrylic esters of aliphatic monohydric alcohols containing from 1 to 4 carbon atoms, 2-ethoxyethyl methacrylate, acrylonitrile, vinyl acetate, styrene and vinyl toluene, and (iii) from 1% to 10% by weight of methacrylic acid, the aggregate of monomers (i), (ii) and (iii) being 100%, the copolymer having the following characteristics:

(a) it is soluble in AVTUR 50 aviation kerosene (b) a 0.3% by weight solution of the copolymer in AVTUR 50 aviation kerosene has a relative viscosity in the range 1.3 to 2.1 and a differential orifice flow rate in the range 3 to 6 ccs. per 30 seconds, the terms "soluble", "AVTUR 50", "relative viscosity" and "differential orifice flow rate" having the respective meanings which are hereinafter defined.

By "soluble in AVTUR 50" we mean that solutions of the copolymer in AVTUR 50, at all concentrations in the range 0.05% to 1% by weight, are, notwithstanding that they may appear hazy or opalescent, nevertheless homogeneous in the sense that no gross separation from them of a swollen polymer phase occurs on standing at 20° C.

By "AVTUR 50" we mean a liquid hydrocarbon fuel complying with U.K. Government Specification D.Eng.RD 2494 (NATO Code No. F-35). AVTUR 50 has a flash point not lower than 100° F., and normally has a viscosity of 1.0–1.5 cp at 25° C.

By "relative viscosity" we mean the ratio of (i) the viscosity of the 0.3% by weight copolymer solution in AVTUR 50 when measured by the method of British Standard No. 188:1937 "The Determination of the Viscosity of Liquids in C.G.S. Units", Part 2, using a U-tube viscometer, Size A, at 25° C., to (ii) the viscosity of AVTUR 50 when measured under those some conditions.

By "differential orifice flow rate" we mean the difference between (a) the flow rate of a 0.3% by weight solution of the copolymer in AVTUR 50 through a passage of circular cross-section having a square-edged orifice, the passage having a length of 0.062 inches and a diameter of 0.025 inches, and (b) the flow rate through the same said passage of a Newtonian liquid having the same viscosity as that of the copolymer solution referred to in (a) when the said viscosities are measured by the method of British Standard No. 188:1937, the flow rates being expressed as the volume of liquid in ccs. which passes through the orifice during the second period of 30 seconds of flow. Apparatus suitable for carrying out the differential orifice flow rate determination may be constructed by appropriately modifying a type A cup according to British Standard No. 1733.

As already stated, the copolymers of the invention contain (i) a minimum of 75% by weight of units derived from tert-butyl styrene and (iii) from 1% to 10% by weight of units derived from methacrylic acid. The monomer constituent (ii), as defined above, which makes up the balance of the units of the copolymer and is present in an amount of from 1% to 24% by weight of the total, may be a single monomer selected from the list hereinabove given, or a mixture of two or more such monomers provided that the combined amounts thereof lie within the aforesaid range. The preferred monomer constituent (ii) is methyl methacrylate.

Particularly useful copolymers according to the invention as hereinbefore defined are those of (i) from 75% to 90% by weight of tert-butyl-styrene, (ii) from 7% to 15% by weight of methyl methacrylate and (iii) from 3% to 10% of methacrylic acid. Preferred copolymers within this class are those of (i) from 81% to 85% of tert-butyl-styrene, (ii) from 9% to 11% of methyl methacrylate and (iii) from 6% to 8% of methacrylic acid.

For reasons which will become apparent later, especially useful copolymers according to the invention are those as hereinabove defined which have a glass-rubber transition temperature (Tg) above 40° C.

Preferably, copolymers according to the invention as hereinabove defined have a differential orifice flow rate in the range 4.0 to 5.5 ccs. per 30 seconds.

The copolymers of the invention are most conveniently made by the aqueous emulsion polymerisation of the constituent monomers in the presence of a free radical initiator, especially, a 'redox' initiator system such as a combination of ammonium persulphate and sodium dithionite.

Thus according to a second aspect of the invention there is provided a process for the production of a copolymer which comprises the emulsion polymerisation in an aqueous diluent of a mixture of monomers consisting of (i) at least 75% by weight of tert-butyl-styrene, (ii) from 1% to 24% by weight of a second monomer selected from the acrylic and methacrylic esters of aliphatic monohydric alcohols containing from 1 to 4 carbon atoms, 2-ethoxyethyl methacrylate, acrylonitrile, vinyl acetate, styrene and vinyl-toluene, and (iii) from 1% to 10% by weight of methacrylic acid, the aggregate of (i), (ii) and (iii) being 100%, the copolymer having the characteristics of solubility, relative viscosity and differential orifice flow rate in AVTUR 50 hereinbefore defined and the polymerisation being characterised by the following features:

(a) the aqueous diluent is a mixture of acetone and water in the ratio of from 1:9 to 1:2 by weight;

(b) the ratio of the weight of monomer mixture being polymerised to the weight of aqueous diluent is from 1:9 to 1:1.5;

(c) there is present in the reaction mixture an anionic surface-active agent at a concentration in the range 1% to 10% of the weight of monomer mixture being polymerised;

(d) the reaction mixture is stirred at a temperature between 20° C. and 45° C. for a period of from 6 to 10 hours in the presence of a nitrogen atmosphere;

(e) there is added to the reaction mixture at some point during the first hour, in an amount of 0.05% to 0.3% based on the weight of monomer mixture, a redox initiator;

(f) there is added to the reaction mixture when polymerisation of the monomers is complete, in an amount of 0.001 to 0.1% based on the weight of monomer mixture taken, a chain transfer agent.

With respect to the foregoing characterising features of the process, the following preferences apply:

(a) the aqueous diluent is a mixture of acetone and water in the ratio of 1:4 by weight;

(b) the ratio of the weight of monomer mixture to the weight of aqueous diluent is 1:4;

(c) the anionic surface active agent is sodium dioctyl sulphosuccinate used at a concentration of 2.5% of the weight of monomer mixture;

(d) the reaction mixture is stirred at a temperature in the range 25°–30° C.;

(e) the redox initiator is a mixture of ammonium persulphate and sodium dithionite, in the amounts of 0.05% and 0.075% respectively based on the weight of monomer mixture, and is added during the first 5 to 15 minutes of reaction time;

(f) the chain transfer agent is n-octyl mercaptan, in an amount of 0.005% based on the weight of monomer mixture taken.

The above preferred features may be observed either individually or together in groups of two or more, in carrying out the process of the invention.

In defining the process of the invention in the above terms, we assume that the person skilled in the art will follow the general procedure which is customary in carrying out aqueous emulsion polymerisations, and will also observe the usual precautions particularly in regard to the exclusion of contaminants such as transition metal compounds and reducing agents which may substantially influence the initiation mechanism and hence the course of the polymerisation.

The copolymer particles obtained by means of the process described above may be isolated from the emulsion in ways which are well known in the art. A particularly suitable method of isolation is that of spray-drying, for those (the great majority) of the copolymers as hereinbefore defined which have glass-rubber transition temperatures above 40° C.

Copolymers according to the invention are of especial interest as additives to liquid hydrocarbon fuels, in particular to aviation fuels, whereby the tendency of such liquids to disseminate when subjected to conditions of shock may be controlled.

It is known that when a liquid with a free surface is subjected to conditions of shock there is a tendency for the liquid to become disseminated in particulate form and that the effect of shock may be such as to convert a proportion of the liquid into a dispersion of fine liquid droplets in air, i.e. a mist.

It is very desirable to be able to control the extent to which such a dispersion or mist of liquid is formed under shock conditions since, for example, this mist, if inflammable, may constitute a hazard. A situation in which it is most important to keep to a minimum the formation of such mist under shock conditions is the crash of an aircraft carrying inflammable liquids, such as its fuel. Though hydrocarbon fuels now used for aircraft gas turbine engines may be of a higher flash point than aviation gasoline as used in spark-ignition engines, with a consequent reduction in the risk of fire due to ignition of vapour, nevertheless mists of fuels with flash points of 90° F. and higher are highly susceptible to ignition by flames, electrical sparking or the effect of friction, as well as by the presence of hot metal in the engines. There is therefore a considerable fire hazard immediately after a crash of an aircraft using such fuel. Furthermore, there is the risk of propagation of fire to the bulk of liquid fuel even if little damage is caused by ignition of the mist itself.

We have found that the tendency to particulate dissemination under shock conditions of a liquid hydrocarbon fuel suitable for use in gas turbined aircraft and having a flash point of at least 90° F. may be reduced by dissolving in the liquid a copolymer of the kind described above, in a concentration of from 0.05% to 1.0% by weight.

Thus according to a third aspect of the invention we provide a modified liquid hydrocarbon fuel of flash point at least 90° F. suitable for use in gas turbine engined aircraft, and having a reduced tendency to particulate dissemination on being subjected to shock, the fuel containing dissolved therein from 0.05% to 1% by weight of a copolymer of tert-butyl-styrene as hereinabove defined.

Preferably the fuel contains from 0.2% to 0.5% by weight of the dissolved copolymer.

A liquid hydrocarbon fuel which is of particular interest for modification according to the invention is AVTUR 50 aviation kerosene as hereinabove defined, but other suitable fuels include aviation turbine fuels JP-8 (flash point 110° F. min) as specified in U.S. Military Specification MIL-T-83133, JP-5 (flash point 140° F. min) as specified in U.S. Military Specification MIL-T-5624G, and Jet A and Jet A-1 (flashpoint 110° F. min) as specified in ASTM Specification D.1655/68.

At the copolymer concentrations indicated above, dissolution of the copolymer (as isolated, for example, by spray drying) in the liquid fuel may be effected by simple stirring or agitation, although it is desirable in many cases to heat the mixture at the same time, e.g. to a temperature of 80° C. When it is not practicable to isolate the copolymer in powder form, an alternative procedure for dissolving it in the liquid fuel is to add the aqueous latex slowly to the liquid fuel maintained at a temperature in the range 130°–150° C., under which conditions the water from the latex is removed as an azeotrope.

The hydrocarbon fuels as modified are still liquids, in the sense that they have a viscosity of less than 1 poise, usually less than 0.1 poise.

There have previously been described, for example in British Pat. Nos. 1,259,113; 1,285,197 and 1,332,593, liquid hydrocarbon fuels which, by virtue of their containing in solution other specified polymers or copolymers in defined proportions, possess improved resistance to particulate dissemination under shock conditions.

Certain of the modified liquid hydrocarbon fuels of the present invention possess an advantage over the modified liquid fuels of the prior art in respect not only of their lower absolute viscosities but also of their low dependence of flow characteristics upon temperature. These advantages are particularly apparent in the case where the fuels contain copolymers according to the invention as hereinabove defined having the monomer composition (i) 81% to 85% of tert-butylstyrene, (ii) 9% to 11% of methyl methacrylate and (iii) 6% to 8% of methacrylic acid. By way of illustration of this reduced temperature dependence of flow characteristics, there may be quoted the following comparative data for the efficiency of pumping, at two different temperatures, of a solution in aviation kerosene of a copolymer according to the invention and of a solution of the same concentration in the same kerosene of a copolymer according to the prior art. The pumping efficiency is calculated as the ratio of output hydraulic power to input electrical power when the liquids in question are delivered by an electrically driven two-stage impeller pump of the type fitted to many aircraft.

| | Pumping Efficiency (AVTUR 50 = 1.0) | |
|---|---|---|
| Temperature, °C. | tert-butylstyrene/ methyl methacrylate/ methacrylic acid copolymer, 83/10/7 by weight, according to the invention:0.3% solution in AVTUR 50. | 2-Ethylhexyl acrylate/acrylic acid copolymer, 95/5 by weight, according to Example 1 of U.K. Pat. No. 1,285,197:0.3% solution in AVTUR 50. |
| 20° | 0.70 | 0.64 |
| −40° | 0.82 | 0.18 |

It will be seen that the pumping efficiency for kerosene modified according to the present invention is unimpaired under low temperature conditions, whereas there is a marked falling-off in efficiency for kerosene modified according to the prior art.

The invention is illustrated but not limited by the following Examples, in which parts are by weight.

EXAMPLES 1–18

General Procedure

To a polymerisation vessel fitted with nitrogen inlet extending below the liquid level there was charged the following:

| Distilled water | 1152 parts |
|---|---|
| Acetone | 288 parts |
| Sodium dioctylsulphosuccinate | 9 parts |

This charge was stirred until the surfactant had completely dissolved. There was then added 360 parts of a pre-mixed charge of monomer having a percentage composition as shown in the table below. The temperature of the reaction mixture was adjusted to 25° C. and a nitrogen sparge was started at the rate of 200 ml of nitrogen per minute per Kg. of total charge. After nitrogen had been passed for 5 minutes, there were added in the order stated the following initiator charges, prepared immediately prior to addition by dissolving each solid in the water:

| Ammonium persulphate | 0.18 part |
|---|---|
| Distilled water | 9 parts |
| Sodium dithionite | 0.3 part |
| Distilled water | 9 parts |

The nitrogen flow rate was then reduced to 50 ml per minute per Kg. of total charge, and the temperature was maintained within the range 25°–30° C. for a total period of 6 hours counted from the addition of the initiators, cooling as necessary in order to control the reaction exotherm. Finally there was added 18 parts of a 0.1% solution of n-octyl mercaptan and stirring and nitrogen flow were then discontinued.

There was thus obtained an aqueous copolymer emulsion of solids content approximately 20% by weight and average particle diameter 0.05–0.1 micron. The relative viscosity and the differential orifice flow rate of each copolymer obtained according to this general procedure, as a 0.3% solution in AVTUR 50, is shown in the table below. The copolymer solutions were obtained by adding the requisite proportion of the aqueous emulsion to AVTUR 50 at 130°–150° C. and removing the water as an azeotrope, then adjusting the concentration.

| Example No. | Monomer Composition, % | | | Identity of monomer* (ii) | Relative Viscosity | Differential orifice flow rate, ccs/30 secs. |
|---|---|---|---|---|---|---|
| | (i) | (ii) | (iii) | | | |
| 1+ | 83 | 10 | 7 | MMA | 1.70 | 4.25 |
| 2 | 83 | 10 | 7 | EA | 1.49 | 4.05 |
| 3 | 83 | 10 | 7 | VA | 1.76 | 4.5 |
| 4 | 83 | 10 | 7 | St | 1.70 | 4.85 |
| 5 | 83 | 10 | 7 | EEMA | 1.58 | 4.65 |
| 6 | 88 | 5 | 7 | MMA | 1.76 | 5.4 |
| 7 | 88 | 5 | 7 | EA | 1.72 | 5.3 |
| 8 | 78 | 15 | 7 | St | 1.47 | 4.45 |
| 9 | 78 | 15 | 7 | EEMA | 2.04 | 4.85 |
| 10 | 86 | 7 | 7 | MMA | 1.54 | 4.7 |
| 11 | 88 | 5 | 7 | MMA | 1.69 | 4.75 |
| 12 | 90 | 3 | 7 | MMA | 1.65 | 5.2 |
| 13 | 92 | 3 | 5 | MMA | 1.79 | 5.45 |
| 14 | 90 | 5 | 5 | MMA | 1.82 | 5.25 |
| 15 | 88 | 7 | 5 | MMA | 1.76 | 5.2 |
| 16 | 85 | 8 | 7 | MMA | 1.85 | 4.2 |
| 17 | 84 | 9 | 7 | MMA | 1.50 | 4.1 |
| 18 | 87 | 10 | 3 | MMA | 1.40 | 4.7 |

*MMA = methacrylate
VA = vinyl acetate
EA = ethyl acrylate
St = styrene
EEMA = 2-ethoxyethyl methacrylate
+The copolymer of Example 1 had a glass-rubber transition temperature of about 120° C.

EXAMPLES 19–22

The general procedure described in Example 1 was repeated, but with variation in certain details as set out in the table below. The monomer composition in all cases was tert-butyl styrene/methyl methacrylate/methacrylic acid=83/10/7.

| Example No. | Variant | Relative viscosity | Differential orifice flow rate, ccs/30 secs. |
|---|---|---|---|
| 19 | Polymerisation temperature 35° C. | 1.35 | 4.3 |
| 20 | Monomer mixture is 30% by weight of total charge | 1.30 | 3.05 |
| 21 | Sodium lauryl sulphate as surfactant | 1.31 | 3.95 |
| 22 | Ammonium salt of sulphated ethoxylated nonylphenyl as surfactant | 1.31 | 4.1 |

EXAMPLES 23–28

A number of the copolymers, the preparation of which is described in the preceding Examples, were also tested for their ability to confer resistance to misting and ignition under simulated aircraft crash conditions. A series of solutions of each polymer in AVTUR 50, having concentrations ranging from 0.05% to 1% by weight, was prepared and these were subjected to test in an apparatus consisting of a small trolley guided along a track and fitted with a propulsion unit capable of accelerating the trolley to a speed of approximately 120 ft/sec. The trolley is coupled to a braking system which is capable of stopping the trolley at a mean deceleration of 30 times the acceleration of gravity. A fuel tank is attached to the trolley and at the forward end of the fuel tank is an orifice which is closed with a weighted rubber bung. Approximately 45 mls of the fuel to be tested are placed in the tank and the trolley is winched back to a release point from which it is released and accelerated up to a speed of 120 ft/sec. The acceleration takes place along about 10 feet of the track and the trolley is then decelerated along about 10 feet of the track by the braking system so that the weighted bung is ejected and the fuel is expelled through the tank orifice.

There is an ignition array of small gas flames spaced linearly at one foot intervals beneath the portion of the track over which deceleration takes place and beyond the track.

When unmodified AVTUR fuel was subjected to the test it produced a flare above the ignition array of 6–7 feet in length and of large volume. On the other hand, when modified AVTUR fuel according to the invention was subjected to the same conditions, a concentration of copolymer of 0.1% or less was found to be effective in preventing any substantial ignition of the fuel. Details of the individual copolymers tested and of the results obtained are shown in the table below.

| Example No. | Copolymer under test. | Concentration (% by weight) required for suppression of flare |
|---|---|---|
| 23 | Copolymer of Example 1 | 0.075 |
| 24 | Copolymer of Example 10 | 0.1 |
| 25 | Copolymer of Example 15 | 0.075 |
| 26 | Copolymer of Example 16 | 0.1 |
| 27 | Copolymer of Example 17 | 0.1 |
| 28 | Copolymer of Example 18 | 0.075 |

EXAMPLE 29

The general procedure described in Examples 1–18 was repeated but with the following modifications in detail:

(i) the amounts of acetone and distilled water in the initial charge were 144 parts and 1296 parts respectively, giving an acetone:water ratio of 1:9 instead of 1:4 as in the earlier case;

(ii) the sodium dithionite (0.3 part) was replaced by L;Ascorbic acid (0.27 part);

(iii) the temperature of polymerisation was 30°–35° C. instead of 25°–30° C.;

(iv) there was used as chain terminator 27 parts of a 0.1% solution of tert-dodecyl mercaptan in place of the 18 parts of a 0.1% solution of n-octyl mercaptan.

The monomer mixture polymerised under these conditions was that employed in Example 1 above. A 0.3% solution of the resulting copolymer in AVTUR 50 had the following characteristics:
Relative viscosity: 1.43
Differential orifice flow rate: 4.2 ccs/30 secs.

We claim:

1. A copolymer of (i) at least 75% by weight of tert-butylstyrene, (ii) from 1% to 24% by weight of a monomer selected from the group consisting of the acrylic and methacrylic esters of aliphatic monohydric alcohols containg from 1 to 4 carbon atoms, 2-ethoxyethyl methacrylate, acrylonitrile, vinyl acetate, styrene and vinyl toluene, and (iii) from 1% to 10% by weight of methacrylic acid, the total amount of monomers (i), (ii) and (iii) being 100%, the copolymer having the following characteristics:

(A) solutions of the copolymer in AVTUR 50 aviation kerosene, at all concentrations in the range 0.05% to 1% by weight, are, notwithstanding that they may appear hazy or opalescent, nevertheless homogeneous in the sense that no gross separation from them of a swollen polymer phase occurs on standing at 20° C., AVTUR 50 being a liquid hydrocarbon fuel complying with U.K. Government Specification D.Eng.RD 2494 (NATO Code No. F-35);

(B) A 0.3% by weight solution of the copolymer in AVTUR 50 aviation kerosene has a relative viscosity in the range 1.3 to 2.1 and a differential orifice flow rate in the range 3 to 6 ccs. per 30 seconds, the said relative viscosity being the ratio of (a) the viscosity of the 0.3% by weight copolymer solution in AVTUR 50 when measured by the method of British Standard No. 188:1937 "The Determination of the Viscosity of Liquids in C.G.S. Units", Part 2, using a U-tube viscometer, Size A, at 25° C., to (b) the viscosity of AVTUR 50 when measured under those same conditions, and the said differential orifice flow rate being the difference between (c) the flow rate of a 0.3% by weight solution of the copolymer in AVTUR 50 through a passage of circular cross-section having a square-edged orifice, the passage having a length of 0.062 inches and a diameter of 0.025 inches, and (d) the flow rate through the same said passage of a Newtonian liquid having the same viscosity as that of the copolymer solution referred to in (c) when the said viscosities are measured by the method of British Standard No. 188:1937, the flow rates being expressed as the volume of liquid in ccs. which passes through the orifice during the second period of 30 seconds of flow.

2. A copolymer as claimed in claim 1, wherein the second monomer is methyl methacrylate.

3. A copolymer as claimed in claim 1 having the monomer composition (i) from 75% to 90% by weight of tert-butyl styrene, (ii) from 7% to 15% by weight of methyl methacrylate and (iii) from 3% to 10% of methacrylic acid.

4. A copolymer as claimed in claim 3 having the monomer composition (i) from 81% to 85% by weight of tert-butyl styrene, (ii) from 9% to 11% by weight of methyl methacrylate and (iii) from 6% to 8% by weight of methacrylic acid.

5. A copolymer as claimed in claim 1 having a differential orifice flow rate in the range 4.0 to 5.5 ccs. per 30 seconds.

6. A process as claimed in claim 1 further characterised by the following features taken either individually or together in groups of two or more:
(a) the aqueous diluent is a mixture of acetone and water in the ratio of 1:4 by weight;
(b) the ratio of the weight of monomer mixture to the weight of aqueous diluent is 1:4;
(c) the anionic surface-active agent is sodium dioctyl sulphosuccinate used at a concentration of 2.5% of the weight of monomer mixture;
(d) the reaction mixture is stirred at a temperature in the range 25°–30° C.;
(e) the redox initiator is a mixture of ammonium persulphate and sodium dithionite, in the amounts of 0.05% and 0.075% respectively based on the weight of monomer mixture, and is added during the first 5 to 15 minutes of reaction time;

(f) the chain transfer agent is n-octyl mercaptan, in an amount of 0.005% based on the weight of monomer mixture taken.

7. A modified liquid hydrocarbon fuel of flashpoint of at least 90° F. suitable for use in gas turbine engined aircraft, and having a rediced tendency to particulate dissemination on being subjected to shock, the fuel containing dissolved therein from 0.05% to 1% by weight of a copolymer of tert-butyl-styrene as claimed in any one of claims 1 to 5.

8. A modified fuel as claimed in claim 7, containing from 0.2% to 0.5% by weight of the dissolved copolymer.

9. A modified fuel as claimed in claim 8 wherein the fuel is AVTUR 50 aviation kerosene, aviation turbine fuel JP-8 flashpoint 110° F. min., aviation turbine fuel JP-5 flashpoint 140° F. min., or Jet A or Jet A-1 flashpoint 110° F. min.

10. A modified fuel as claimed in claim 8, wherein the fuel is AVTUR 50 aviation kerosene, aviation turbine fuel SP-8 flashpoint 110° F. min., aviation turbine fuel JP-5 flashpoint 140° F. min., or Jet A or Jet A-1 flashpoint 110° F. min.

11. In a process for the production of a copolymer by the emulsion polymerization of a mixture of monomers, which comprises emulsifying the said mixture in an aqueous diluent containing a surface-active agent and a polymerization initiator and heating the emulsion so as to effect polymerization of the monomers;

the improvement wherein the mixture of monomers consists of (i) at least 75% by weight of tert-butyl-styrene, (ii) from 1% to 24% by weight of a monomer selected from the group consisting of the acrylic and methacrylic esters of aliphatic monohydric alcohols containing from 1 to 4 carbon atoms, 2-ethoxy-ethyl methacrylate, acrylonitrile, vinyl acetate, styrene and vinyltoluene, and (iii) from 1% to 10% by weight of methacrylic acid, the total amount of monomers (i), (ii) and (III) being 100%, wherein the copolymer has the following characteristics:

(A) solutions of the copolymer in AVTUR 50 aviation kerosene, at all concentrations in the range 0.05% to 1% by weight, are, notwithstanding that they may appear hazy or opalescent, nevertheless homogeneous in the sense that no gross separation from them of a swollen polymer phase occurs on standing at 20° C., AVTUR 50 being a liquid hydrocarbon fuel complying with U.K. Government Specification D.Eng.RD 2494 (NATO Code No. F-35)

(B) A 0.3% by weight solution of the copolymer in AVTUR 50 aviation kerosene has a relative viscosity in the range 1.3 to 2.1 and a differential orifice flow rate in the range 3 to 6 ccs. per 30 seconds, the said relative viscosity being the ratio of (a) the viscosity of the 0.3% by weight copolymer solution in AVTUR 50 when measured by the method of British Standard No. 188:1937 "The Determination of the Viscosity of Liquids in C.G.S. Units", Part 2, using a U-tube viscometer, Size A, at 25° C., to (b) the viscosity of AVTUR 50 when measured under those same conditions, and the said differential orifice flow rate being the difference between (c) the flow rate of a 0.3% by weight solution of the copolymer in AVTUR 50 through a passage having a length of 0.062 inches and a diameter of 0.025 inches, and (d) the flow rate through the same said passage of a Newtonian liquid having the same viscosity as that of the copolymer solution referred to in (c) when the said viscosities are measured by the method of British Standard No. 188:1937, the flow rates being expressed as the volume of liquid in ccs. which passes through the orifice during the second period of 30 seconds of flow.

and further wherein the polymerisation process is characterised by the following features:

(a) the aqueous diluent is a mixture of acetone and water in the ratio of from 1:9 to 1:2 by weight;

(b) the ratio of the weight of monomer mixture being polymerised to the weight of aqueous diluent is from 1:9 to 1:1.5;

(c) there is present in the reaction mixture an anionic surface-active agent at a concentration in the range 1% to 10% by weight of monomer mixture being polymerised;

(d) the reaction mixture is stirred at a temperature between 20° C. and 45° C. for a period of from 6 to 10 hours in the presence of a nitrogen atmosphere;

(e) there is added to the reaction mixture at some point during the first hour, in an amount of 0.05% to 0.3% based on the weight of monomer mixture, a redox initiator;

(f) there is added to the reaction mixture when polymerisation of the monomers is complete, in an amount of 0.001 to 0.1% based on the weight of monomer mixture taken, a chain transfer agent.

* * * * *